US012763924B2

(12) United States Patent
Yu et al.

(10) Patent No.: US 12,763,924 B2
(45) Date of Patent: Oct. 13, 2026

(54) INDICATING PRESENCE OF A PORTION OF DATA CORRESPONDING TO A PREDETERMINED PATTERN AT A RECEPTION DATAPATH OF A PHYSICAL LAYER

(71) Applicant: Microchip Technology Incorporated, Chandler, AZ (US)

(72) Inventors: Jiachi Yu, Foshan (CN); Dixon Chen, Shenzhen (CN); Thor Lei Xia, Shenzhen (CN); Kevin Yang, Shenzhen (CN); Hongming An, San Diego, CA (US); Markus N. Becht, Marxzell (DE)

(73) Assignee: Microchip Technology Incorporated, Chandler, AZ (US)

( * ) Notice: Subject to any disclaimer, the term of this patent is extended or adjusted under 35 U.S.C. 154(b) by 47 days.

(21) Appl. No.: 18/667,841

(22) Filed: May 17, 2024

(65) Prior Publication Data

US 2024/0388416 A1 Nov. 21, 2024

(30) Foreign Application Priority Data

May 18, 2023 (CN) ......................... 202310566068.5

(51) Int. Cl.

| | |
|---|---|
| ***H03D 1/00*** | (2006.01) |
| ***G06F 18/30*** | (2023.01) |
| ***H04L 7/04*** | (2006.01) |
| ***H04L 27/06*** | (2006.01) |

(52) U.S. Cl.
CPC .............. *H04L 7/042* (2013.01); *G06F 18/30* (2023.01)

(58) Field of Classification Search
CPC ....... H04L 7/042; G06F 18/30; H04W 56/001
USPC ......................... 375/343, 344, 362, 364, 368
See application file for complete search history.

(56) References Cited

U.S. PATENT DOCUMENTS

| | | | | |
|---|---|---|---|---|
| 9,432,077 B2 | 8/2016 | Schmidl | | |
| 11,050,501 B2 | 6/2021 | Rentschler | | |
| 2009/0310653 A1 | 12/2009 | Gorday | | |
| 2022/0376886 A1* | 11/2022 | Wichlund | ........... | H04W 56/001 |

FOREIGN PATENT DOCUMENTS

| | | |
|---|---|---|
| CN | 108683625 A | 10/2018 |

OTHER PUBLICATIONS

International Search Report of International Application No. PCT/US2024/030056, mailed Sep. 24, 2024, 4 pages.
Written Opinion of the International Searching Authority of International Application No. PCT/US2024/030056, mailed Sep. 24, 2024, 7 pages.

* cited by examiner

*Primary Examiner* — Phuong Phu
(74) *Attorney, Agent, or Firm* — TraskBritt

(57) ABSTRACT

One or more examples relate to a method that includes: applying oversampling to data on a reception datapath of a physical layer; generating a first signal indicating relationships between patterns exhibited by portions of oversampled data and a predetermined pattern; generating a second signal indicating an observed feature of the first signal, the observed feature indicative of a highest relationship between the patterns exhibited by respective portions of oversampled data and the predetermined pattern; and providing the second signal to indicate presence of a portion of data corresponding to the predetermined pattern at a coupled portion of the reception datapath of the physical layer.

24 Claims, 10 Drawing Sheets

INDICATING PRESENCE OF A PORTION OF DATA CORRESPONDING TO A PREDETERMINED PATTERN AT A RECEPTION DATAPATH OF A PHYSICAL LAYER

PRIORITY CLAIM

This application claims the benefit of the filing date of Chinese Patent Application Serial No. 202310566068.5, filed May 18, 2023, for "INDICATING PRESENCE OF A PORTION OF DATA CORRESPONDING TO A PREDETERMINED PATTERN AT A RECEPTION DATAPATH OF A PHYSICAL LAYER."

BACKGROUND

Interconnects are widely used to facilitate communication among devices of a network, sub-systems and systems. Generally speaking, electrical signals are transmitted on a physical medium (e.g., a bus, a coaxial cable, or a twisted pair, without limitation—generically referred to simply as a "line" or a "bus") by the devices coupled to the physical medium.

According to the Open Systems Interconnection model (OSI model), Ethernet-based computer networking technologies use baseband transmission (i.e., electrical signals are discrete electrical pulses) to transmit data packets and ultimately messages that are communicated among network devices. According to the OSI model, specialized circuitry called a physical layer (PHY) device is used to interface between an analog domain of a line and a digital domain of a data link layer (also referred to herein simply as a "link layer") that operates according to packet signaling. While the data link layer may include one or more sublayers, in Ethernet-based computer networking, a data link layer typically includes at least a media access control (MAC) layer that provides control abstraction of the physical layer. By way of non-limiting example, when transmitting data to another device on a network, a MAC controller may prepare messages for the physical medium, add error correction elements, and implement collision avoidance. Further, when receiving data from another device, a MAC controller may ensure integrity of received data and prepare messages for higher layers.

There are various network topologies that implement physical layers and link layers (and may include other layers, without limitation). The Peripheral Component Interconnect (PCI) standard and the Parallel Advanced Technology Attachment (Parallel ATA) standard, both in use since the early 1990s, may implement a multidrop bus topology. The trend since the early 2000s has been to use point-to-point bus topologies, for example, the PCI Express standard (PCIe) and the Serial ATA (SATA) standard implement point-to-point topologies.

A typical point-to-point bus topology may implement lines between each device (e.g., dedicated point-to-point, without limitation) or lines between devices and switches (e.g., switched point-to-point, without limitation). In a multidrop bus topology, a physical transmission medium is a shared bus and each network device is coupled to the shared bus, for example, via a circuit chosen based on the type of physical medium (e.g., coaxial or twisted pair, without limitation).

Point-to-point topologies, such as a dedicated point-to-point topology or a switched point-to-point topology, require more wires and more expensive material than multidrop topologies due, in part, to the greater number of links between devices. In certain applications, such as automotive, there may be physical constraints that make it difficult to directly connect devices, and so a topology that does not require, or does not require as many, direct connections (e.g., a multidrop topology, without limitation) in a network or a sub-network may be less susceptible to, or hampered by, such constraints.

Devices that are on a baseband network (e.g., a multidrop network without limitation) share the same physical transmission medium, and typically use the entire bandwidth of that medium for transmission (stated another way, a digital signal used in baseband transmission occupies the entire bandwidth of the media). As a result, only one device on a baseband network may transmit at a given instant. So, media access control methods are sometimes used to handle contention for such a shared transmission medium.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
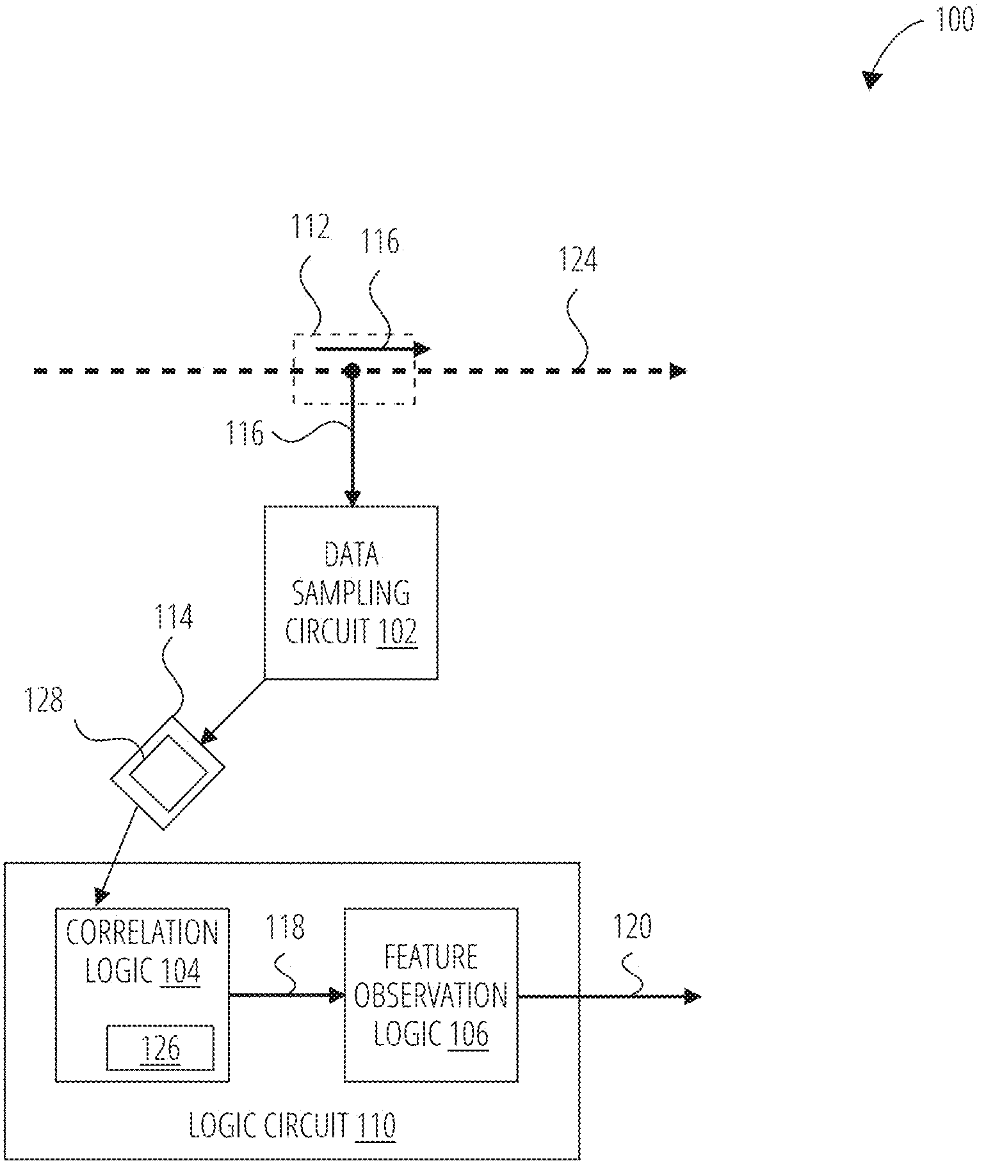
FIG. 1 is a block diagram depicting an apparatus to indicate presence of a portion of data corresponding to a predetermined pattern at a coupled portion of a reception datapath of a physical layer, in accordance with one or more examples.

In the following detailed description, reference is made to the accompanying drawings, which form a part hereof, and in which are shown, by way of illustration, specific examples of examples in which the present disclosure may be practiced. These examples are described in sufficient detail to enable a person of ordinary skill in the art to practice the present disclosure. However, other examples enabled herein may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. In some instances, similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawings could be arranged and designed in a wide variety of different configurations. Thus, the following description of various examples is not intended to limit the scope of the present disclosure, but is merely representative of various examples. While the various aspects of the examples may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the examples disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein—all of which are encompassed by use of the term "processor." A general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code, without limitation) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least 90% met, at least 95% met, or even at least 99% met.

As used herein, any relational term, such as "over," "under," on, "underlying," "upper," "lower," etc., is used for clarity and convenience in understanding the disclosure and accompanying drawings and does not connote or depend on any specific preference, orientation, or order, except where the context clearly indicates otherwise.

In this description the term "coupled" and derivatives thereof may be used to indicate that two elements co-operate or interact with each other. When an element is described as being "coupled" to another element, then the elements may be in direct physical or electrical contact or there may be intervening elements or layers present. In contrast, when an element is described as being "directly coupled" to another element, then there are no intervening elements or layers present. The term "connected" may be used in this description interchangeably with the term "coupled," and has the same meaning unless expressly indicated otherwise or the context would indicate otherwise to a person having ordinary skill in the art.

A vehicle, such as an automobile, a truck, a bus, a ship, and/or an aircraft, may include a vehicle communication network. The complexity of the vehicle communication network may vary depending on a number of electronic devices within the network. For example, an advanced vehicle communication network may include various control modules for, as non-limiting examples, engine control, transmission control, safety control (e.g., antilock braking), and emissions control. To support these modules, the automotive industry relies on various communication protocols.

10SPE (i.e., 10 Mbps Single Pair Ethernet, also referred to as "10BASE-T1S") is a network technology specified in IEEE 802.3cg™. 10SPE may be used to provide a collision free, deterministic transmission on, e.g., a multi-drop network or shared transmission medium, without limitation.

1588 Precision-Time-Protocol (PTP) is a network technology utilized to synchronize clocks in a computer network specified in IEEE 1588 ("1588 PTP"). In 10BASE-T1S, a 1588 PTP media access controller (MAC) generates a timestamp when a start-of-frame-delimiter (SFD) crosses a media-independent-interface (MII) between the MAC and a physical layer (PHY) device, and adds to or subtracts from the timestamp a value to obtain a timestamp that represents when the SFD crosses the media-dependent-interface (MDI). The added or subtracted value, as the case may be, represents a known fixed-latency between a media-dependent interface (MDI), which is an interface between a PHY and a cable, and the MII between the MAC and PHY. Herein, a PHY device may also be referred to as a "PHY."

Sometimes a PHY has a variable latency, but it is desirable to know, with a relatively high degree of certainty, when a packet is sent or received over a network. A PHY may be utilized that includes a pattern matcher to observe frames on an internal MII of the PHY (e.g., between a physical coding sublayer (PCS) and a physical layer collision avoidance (PLCA) reconciliation sublayer (RS) or "PLCA RS").

The pattern matcher generates a pulse in response to detecting symbols corresponding to an SFD at the internal MII between the PCS and PLCA RS. The pulse is provided to the MAC via a further MII that is an interface between the MAC and PHY. However, in a PLCA PHY, the latency of the PLCA RS and the internal MII is not fixed or known.

Further, if the clock of the MII between MAC and PHY has a lower resolution than the clock of the PHY, then the pulse generated by the pattern matcher may wait up to a clock period of the MII to be conveyed to the MAC. The MAC uses the time when it received the pulse to generate a timestamp, thus, the difference between a value of a timestamp generated by the MAC in response to the pulse, and the actual time the pulse was generated at the PHY, may be as much as clock period of the further MII's clock.

The inventors of this disclosure appreciate that the latency of a PLCA RS is variable (not fixed), while the latency between the PCS and the MDI is fixed. The inventors of this disclosure appreciate that to reduce uncertainty about PHY latency, it would be desirable to perform pattern matching at a portion of the reception path between the MDI and the PCS. The PCS is responsible for as non-limiting examples: encoding, decoding, scrambling, descrambling, alignment marker insertion and removal, and block and symbol deskew. Prior to the PCS, noise and sampling phase may corrupt data samples taken by a pattern matcher to such an extent that detection of a predetermined pattern of symbols, bit for bit, is not reliable.

Further, the inventors of this disclosure appreciate that to reduce uncertainty about a PHY latency, it would be desirable to use a different path than the MII between PHY/MAC that introduces less uncertainty than the MII.

One or more examples relate, generally, to utilizing a correlator to detect predetermined patterns exhibited by data on a reception datapath of a PHY. The correlator may be coupled to observe a data stream at a portion of a reception datapath of a PHY located prior to a PCS block and detect predetermined patterns exhibited by data of the data stream.

As used herein, the term "data" should be understood to include data and symbols used to represent data, unless otherwise explicitly stated or the context in which it is used would a different interpretation to a person having ordinary skill in the art. A start-of-frame-delimiter, an Ethernet preamble, and an Ethernet start-of-stream delimiter (SSD) are respectively herein considered to be a portion of data.

FIG. 1 is a block diagram depicting an apparatus 100 to indicate presence of a portion of data corresponding to a predetermined pattern (also referred to herein simply as a "portion of data") at a coupled portion of a reception datapath of a physical layer, in accordance with one or more examples. Apparatus 100 may include data sampling circuit 102 and logic circuit 110. Logic circuit 110 may include correlation logic 104, and feature observation logic 106. Apparatus 100, and more specifically, data sampling circuit 102, may be coupled to receive data 116 from a portion 112 of reception datapath 124 of a PHY. Depiction by FIG. 1 of portion 112 of reception datapath 124 of a PHY is for ease of discussion and is not intended to limit the scope of the disclosure in any way. Inclusion of portion 112 of reception datapath 124 at apparatus 100 is optional.

In one or more examples, apparatus 100, and more specifically, logic circuit 110, may infer, via correlative calculations, portion(s) of data that correspond to various predetermined patterns. Apparatus 100 may observe data 116 at reception datapath 124 (e.g., may sample data 116 on reception datapath 124, without limitation) and generate a second signal 120 (which may also be referred to, interchangeably, herein as "feature identification signal 120" or "second signal 120") indicative of a portion of data 116 that corresponds (e.g., is correlated with, without limitation) to a predetermined pattern 126 of bits or symbols, and by inference, indicative of presence of a portion of data at a coupled portion (e.g., portion 112, without limitation) of the reception datapath 124 of the PHY. In one or more examples, a coupled portion of a reception datapath of a PHY may be a predetermined reference plane of the PHY.

In one or more examples, data sampling circuit 102 oversamples data 116 at reception datapath 124 and provides portions of oversampled data 114 to logic circuit 110. Data sampling circuit 102 may be coupled to portion 112 (also referred to herein as "coupled portion 112") of reception datapath 124 to oversample data 116. Oversampling data includes, without limitation, sampling data at a sampling frequency higher than the Nyquist rate (e.g., twice the bandwidth of data 116, without limitation). Any rate suitably higher than the Nyquist rate based on operating conditions may be chosen for the sampling rate of data sampling circuit 102. Oversampling may improve one or more of resolution and signal-to-noise ratio, and reduce aliasing and phase distortion. It is easier to recover a signal from oversampled data 114 than data 116. In one or more examples, a location of coupled portion 112 of reception datapath 124 may be any location on reception datapath 124, including, but not limited to, a location just before a PCS block of the PHY.

In one or more examples, logic circuit 110 receives portions of oversampled data 114 from data sampling circuit 102 and generates second signal 120, which is indicative of portions of data 116 that correspond to a predetermined pattern 126. Portions of oversampled data 114 may be, or may include, oversampled versions of data 116. Instances of portions of oversampled data 114 may exhibit one or more patterns ("exhibited patterns 128"), including without limitation substantially exhibit predetermined patterns 126.

In one or more examples, correlation logic 104 of logic circuit 110 generates a signal 118 (also referred to herein as "first signal 118" or a "correlation signal 118") indicative of relationships between exhibited patterns 128 of portions of oversampled data 114 and predetermined pattern 126. A relationship between exhibited patterns 128 of portions of oversampled data 114 and predetermined pattern 126 indicated by correlation logic 104 may be a degree of sameness or a degree of difference between exhibited patterns 128 and predetermined pattern 126. In one or more examples, a given level of first signal 118 may represent a magnitude of the relationship between exhibited patterns 128 and predetermined pattern 126 calculated by correlation logic 104. Accordingly, if a level of first signal 118 at a first time is greater than a level of first signal 118 at a second, different, time, then that would indicate a stronger relationship between a portion of oversampled data 114 and predetermined pattern 126 at the first time, than a further portion of oversampled data 114 and predetermined pattern 126 at the second time.

In one or more examples, feature observation logic 106 of logic circuit 110 generates second signal 120 indicative of a detected feature of first signal 118. In one or more examples, a feature to be detected is indicative of a predetermined relationship (e.g., a suitably strong relationship, without limitation) between exhibited patterns 128 of portions of oversampled data 114 and predetermined pattern 126. In one or more examples, a threshold value may be utilized to observe that a level of first signal 118 indicates sufficient correlation to predetermined pattern 126, so the feature may be a level of first signal 118 that exceeds such a threshold value.

In some cases, there may be multiple instances of levels of first signal 118 above a threshold value or no threshold value is utilized at all. In either case, a highest relationship between exhibited patterns 128 of portions of oversampled data 114 and predetermined pattern 126 may be observed by feature observation logic 106 utilizing first signal 118. Given that a signal level of first signal 118 indicates a strength of relationship, the detected feature may be a peak amplitude of first signal 118 (in a case where first signal 118 is a continuous waveform), as described herein, above a threshold value.

Figure 2:
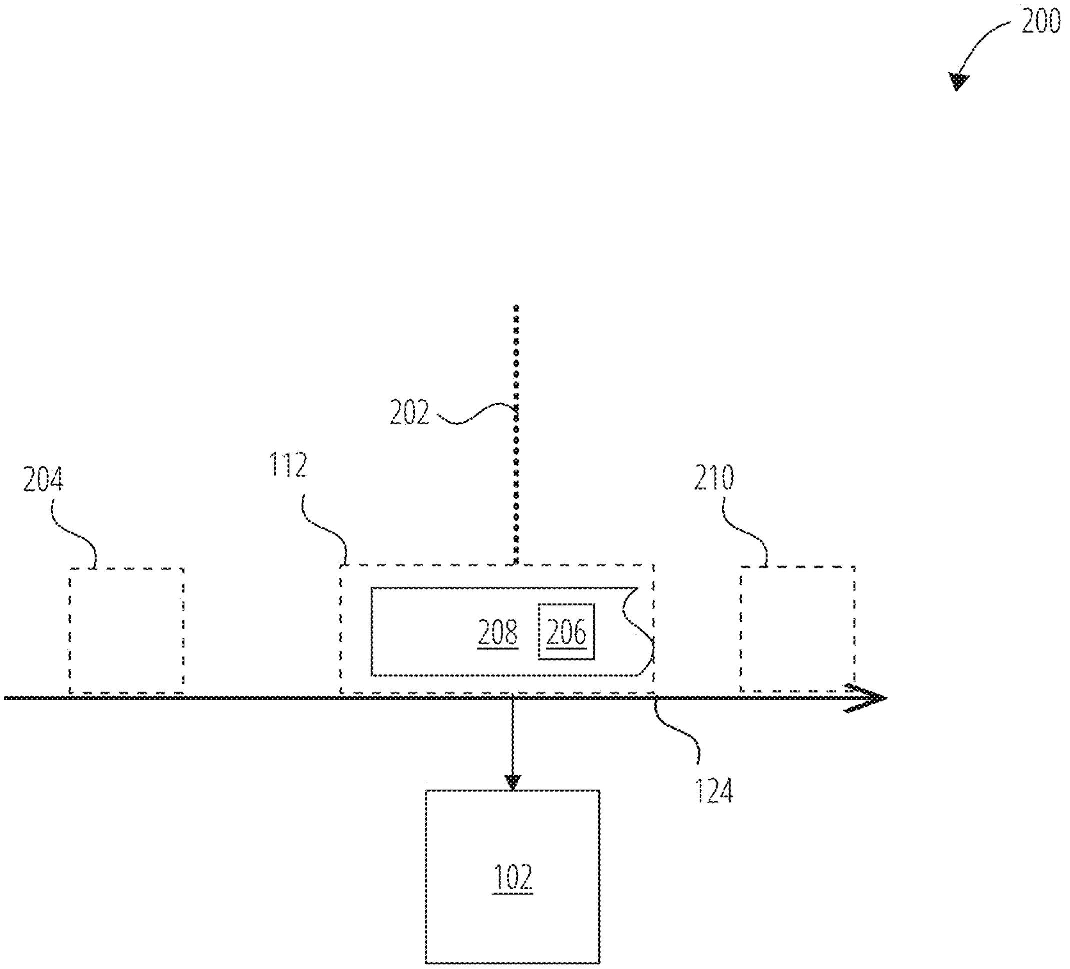
FIG. 2 is a block diagram depicting a portion of an apparatus of FIG. 1, in accordance with one or more examples.

FIG. 2 is a block diagram depicting a portion 200 of an apparatus 100 (also referred to herein as "apparatus portion 200"), in accordance with one or more examples. Apparatus portion 200 may include a data sampling circuit 102, coupled portion 112 of reception datapath 124, a predetermined reference plane of PHY 202, an optional MDI 204 and an optional PCS block 210.

In the specific example depicted by FIG. 2, coupled portion 112 of reception datapath 124 is located at or near a predetermined reference plane of PHY 202. In one or more examples, predetermined reference plane of PHY 202 may be set to any location in reception datapath 124, including, without limitation, various interfaces between processing blocks of a PHY. In the specific example depicted by FIG. 2, the predetermined reference plane of PHY 202 is located between MDI 204 and PCS block 210. Utilization of other locations as a reference plane is specifically contemplated, and does not exceed the scope of this disclosure.

Portion of data 208 may exhibit a pattern 206 ("exhibited pattern 206"), which, in various examples, may be an Ethernet preamble, an Ethernet start-of-frame delimiter (SFD), an Ethernet start-of-stream delimiter (SSD), or other symbols, which as indicated above are considered herein respectively to be a portion of data. 1588 PTP specifies that the reference plane for 1588 timestamps is when an SFD crosses the PHY-cable interface. In cases where the SSD preamble, or another known sequence of bits or symbols located a known fixed number of bits prior to an SFD are utilized as predetermined pattern 126 then second signal 120 may be delayed by a predetermined number of bits that represent the distance, in bits, between the SSD preamble and the SFD to indicate a portion of data 116 that corresponds to the SFD and, more generally, the desired reference plane.

Figure 3:
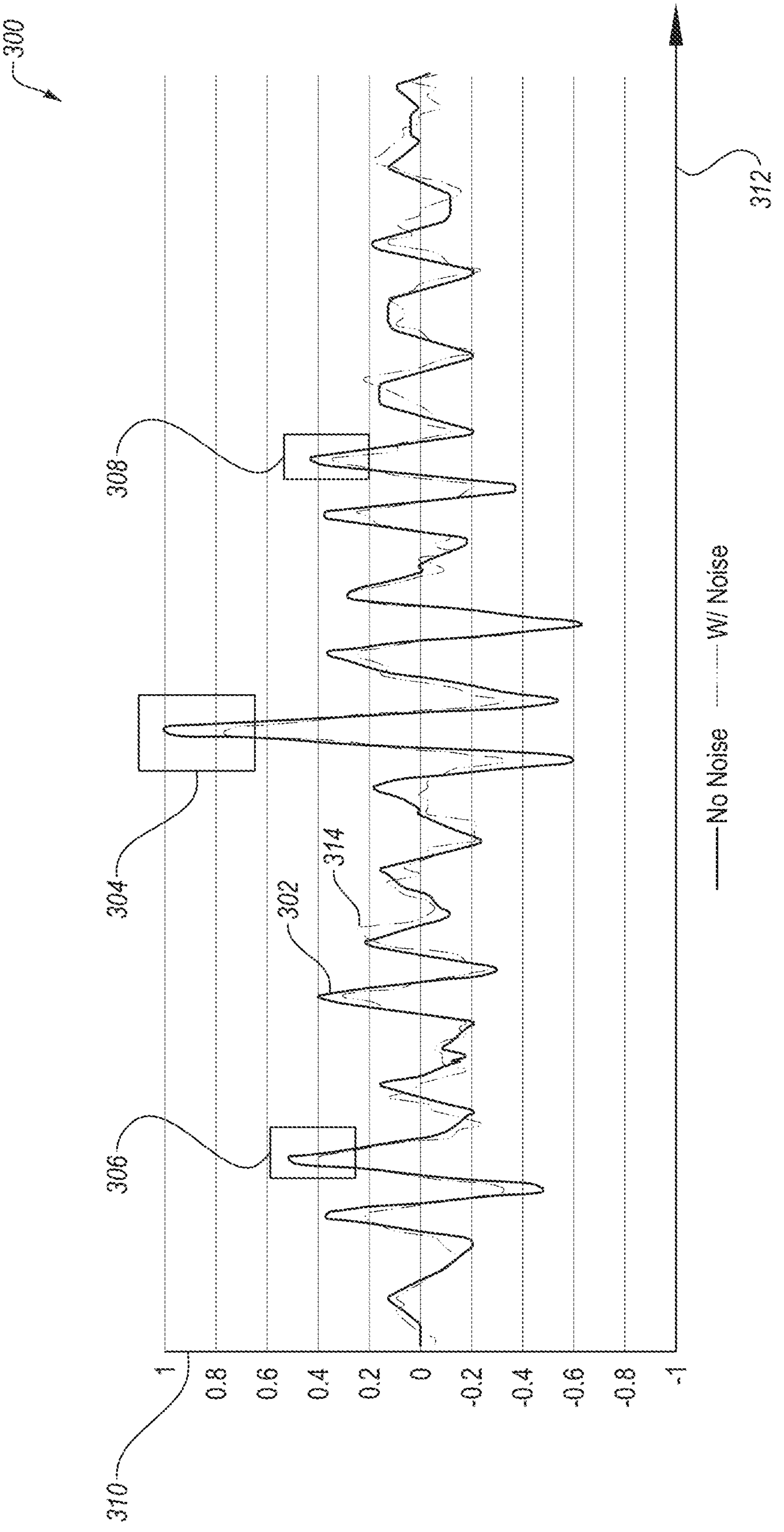
FIG. 3 is a graph that depicts a line that represents an example correlation signal with noise, and a line that represents an example correlation signal without noise, in accordance with one or more examples.

FIG. 3 is a graph 300 that depicts a line 302 that represents an example correlation signal (e.g., example of correlation signal 118, without limitation) generated with noise by apparatus 100 or apparatus portion 200, in accordance with one or more examples. Line 314 represents an example correlation signal generated without noise by apparatus 100 or apparatus portion 200, in accordance with one or more examples. Line 314 is depicted as a visual reference, as typically a disclosed correlation signal will be observed with some noise.

Horizontal axis 312 of graph 300 represents time, increasing from left to right, and vertical axis 310 of graph 300 is the strength of correlation where a '1' corresponds to 100% correlated, a '0' corresponds to 0% directly or inversely correlated (or 100% un-correlated), and '−1' corresponds to 100% inversely correlated.

Line 302 (and line 314) includes multiple peaks, for example, peak 304, peak 306 and peak 308. A peak is formed when the strength of correlation indicated by the correlation signal changes from generally increasing to generally decreasing.

Feature observation logic 106 compares the heights of various peaks (e.g., values of strength of correlation associated with such peaks), such as peak 304, peak 306 and 308, and observes that peak 304 is the highest peak of line 302 for the depicted period of time. A portion of data associated with peak 304 may be inferred to correspond to a predetermined pattern (e.g., predetermined pattern 126, without limitation). In one or more examples, a peak threshold may be utilized to observe that a peak indicates sufficient correlation to a predetermined pattern. Non-limiting examples of a peak threshold value include at least 0.95, at least 0.9, at least 0.85, least 0.8, least 0.75, or at least 0.7. In some cases, corruption caused by the oversampling process may introduce noise to first signal 118, so a peak threshold value may be chosen that is less than 1, while still being sufficiently reliable in detecting a predetermined pattern.

Timing T that corresponds to peak 304 may be captured by feature observation logic 106 to indicate a timing of the portion of data 116 that corresponds to peak 304 and thus, indicate a timing of the portion of data 116 that corresponds to predetermined pattern 126.

Figure 4:
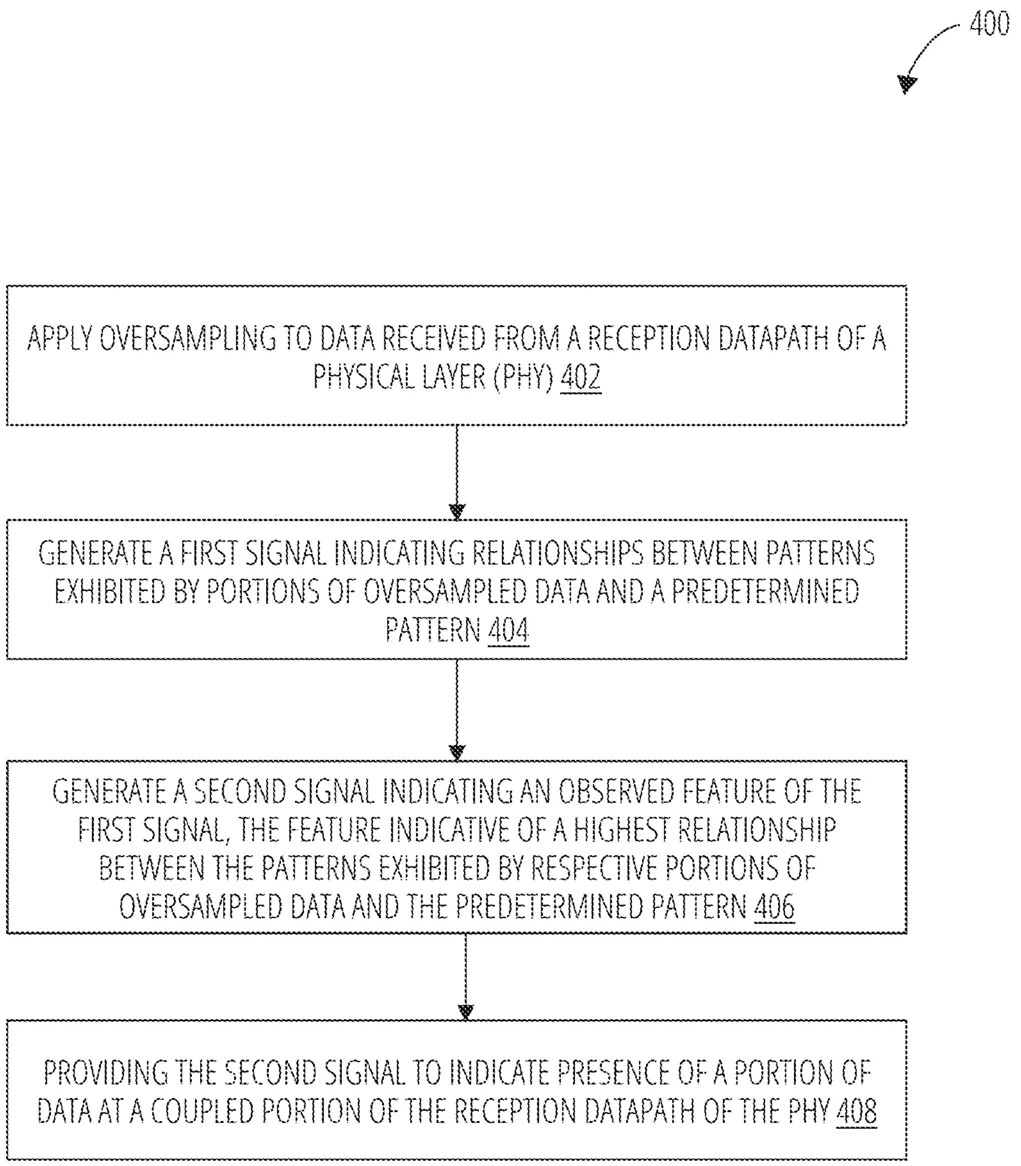
FIG. 4 is a flow diagram depicting a process to generate a signal indicative of a portion of data corresponding to a predetermined pattern exhibiting a predetermined pattern, in accordance with one or more examples.

FIG. 4 is a flow diagram depicting a process 400 to generate a signal indicative of a portion of data exhibiting a predetermined pattern, in accordance with one or more examples. Some or a totality of process 400 may be performed, as a non-limiting example, by apparatus 100 of FIG. 1.

At operation 402, process 400 applies oversampling (e.g., via data sampling circuit 102 of FIG. 1, without limitation) to data (e.g., data 116, without limitation) received from a data reception path of a PHY (e.g., reception datapath 124 of FIG. 1, without limitation). In one or more examples, applying oversampling to the data may include applying the oversampling to a copy of the data or a copy of a portion of the data.

At operation 404, process 400 generates a first signal (e.g., first signal 118) indicating relationships between patterns exhibited by portions of oversampled data (e.g., exhibited patterns 128, exhibited by portions of oversampled data 114, without limitation) and a predetermined pattern (e.g., predetermined pattern 126, without limitation).

At operation 406, process 400 generates a second signal (e.g., second signal 120, without limitation) indicating an observed feature (e.g., a peak, without limitation) of the first signal. The observed feature is indicative of a highest relationship between the patterns exhibited by respective portions of oversampled data and the predetermined pattern, and by inference, indicative of a portion of data 116 that corresponds to the predetermined pattern.

At operation 408, process 400 provides the second signal (e.g., second signal 120, without limitation) to indicate observation of a pattern correlated most strongly with the predetermined pattern, which is used as an indication of presence of a portion of data (e.g., a portion of data 116, without limitation) corresponding to the predetermined pattern at a coupled portion (e.g., coupled portion 112, without limitation) of the reception datapath (e.g., reception datapath 124, without limitation) of the PHY. In one or more examples, the indication of presence may be inferred to be an indication of presence at a predetermined reference plane of a PHY such as an SFD crossing an MDI, e.g., predetermined reference plane of PHY 202, without limitation.

Figure 5:
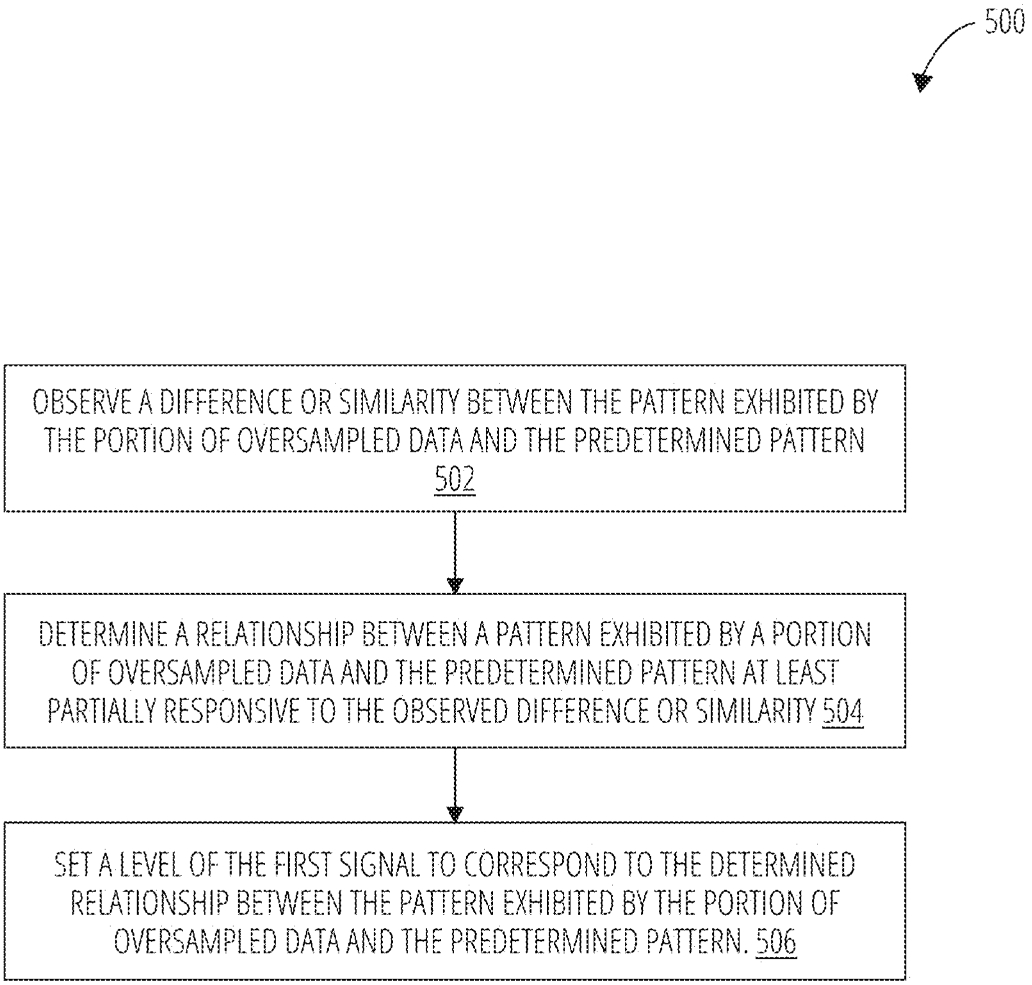
FIG. 5 is a flow diagram depicting a process to generate a signal indicative of relationships between patterns exhibited by portions of oversampled data and a predetermined pattern, in accordance with one or more examples.

FIG. 5 is a flow diagram depicting a process 500 to generate a signal indicative of relationships between patterns exhibited by portions of oversampled data and a predetermined pattern, in accordance with one or more examples.

At operation 502, process 500 observes a difference or similarity between the pattern exhibited by the portion of oversampled data and the predetermined pattern. At operation 504, process 500 determines a relationship between a pattern exhibited by a portion of oversampled data (e.g., a portion of portions of oversampled data 114, without limitation) and the predetermined pattern (e.g., predetermined pattern 126, without limitation) at least partially responsive to the observed difference or similarity between the pattern exhibited by the portion of oversampled data and the predetermined pattern.

At operation 506, set a level of a first signal (e.g., first signal 118, without limitation) to correspond to determined relationships between the patterns exhibited by portions of oversampled data and the predetermined pattern. As a non-limiting example, setting the value of the first signal to a "1" may indicate 100% correlation, "0" may indicate no direct or indirect correlation (i.e., 100% uncorrelated), and "−1" may indicate 100% inverse correlation, and levels there between indicating varying degrees of correlation.

Figure 6:
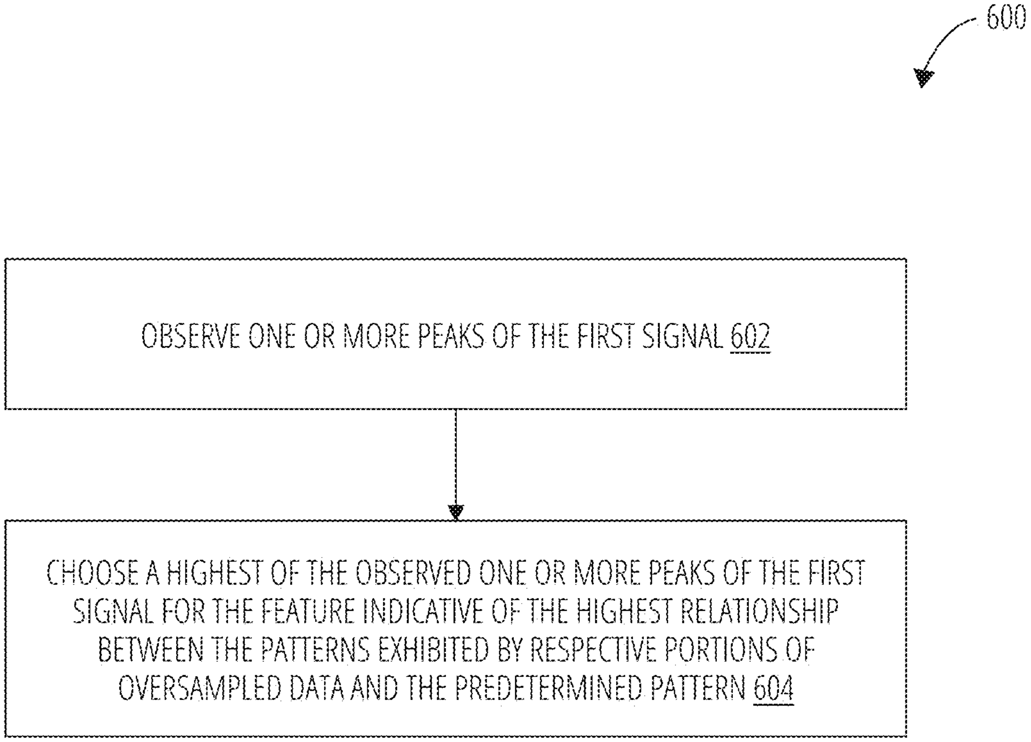
FIG. 6 is a flow diagram depicting a process for determining a feature indicative of a highest relationship between the patterns exhibited by respective portions of oversampled data and the predetermined pattern, in accordance with one or more examples.

FIG. 6 is a flow diagram depicting a process 600 for determining a feature indicative of a highest relationship between the patterns exhibited by respective portions of oversampled data and the predetermined pattern, in accordance with one or more examples.

At operation 602, process 600 observes one or more peaks of the first signal. As discussed above, a peak is formed when the strength of correlation indicated by the correlation signal changes from generally increasing to generally decreasing. In one or more examples, various peaks may be observed by observing that the value of the first signal changes from generally increasing to generally decreasing, and capturing the value of the first signal when the change occurred. In one or more examples, during a given time duration, multiple such changes of the value of the first signal may be observed and the associated levels of the first signal captured.

At operation 604, process 600 chooses a highest of the observed one or more peaks of the first signal for the feature indicative of the highest relationship between the patterns exhibited by respective portions of oversampled data and the predetermined pattern.

In one or more examples, operation 602 and operation 604 may be performed separately or in an integrative manner. When performed separately, multiple levels of the first signal may be captured during operation 602, and then in operation 604 the captured multiple levels of the first signal may be compared and the highest captured value of the first signal chosen. When performed in an integrative manner, when a new peak is detected and new associated value of the first signal captured, the new associated value of the first signal is compared to a previous highest associated value of the first signal and if the new associated value of the first signal is higher, it is stored as the new highest associated value of the first signal for the given time duration, and if it is lower than the previous highest associated value of the first signal, the previous highest associated value of the first signal is retained and the new associated level the previous highest associated value of the first signal is discarded.

As discussed above, the SSD is located a fixed bit distance before the SFD in an Ethernet frame. In various examples where an SSD or another known sequence of bits or symbols located a known fixed number of bits from an SFD is utilized as predetermined pattern 126 then a timing of second signal 120 may be adjusted to indicate the SFD instead of the SSD.

Figure 7:
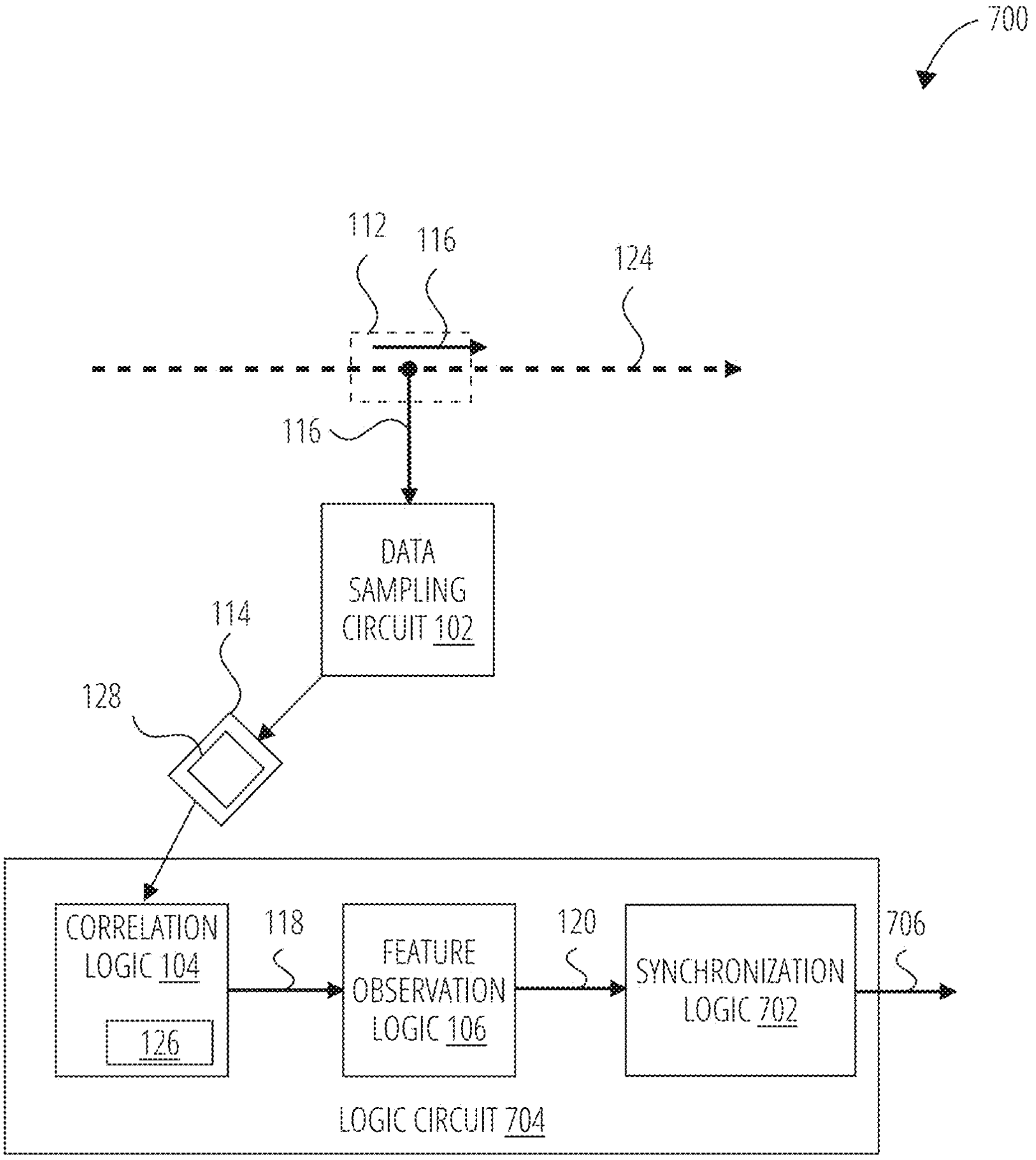
FIG. 7 is a block diagram depicting a system for adjusting timing of a signal to indicate presence of a portion of data corresponding to a predetermined pattern at a coupled portion of a reception datapath of a physical layer, in accordance with one or more examples.

FIG. 7 is a block diagram depicting an apparatus 700 to adjust timing of a signal indicative of presence of a portion of data corresponding to a predetermined pattern at a coupled portion of a reception datapath of a PHY, and more specifically, to adjust a timing of feature identification signal 120 to indicate an SFD instead of an SSD preamble, or another known sequence of bits or symbols located a known fixed number of bits from an SFD, in accordance with one or more examples. Apparatus 700 includes certain elements of apparatus 100 of FIG. 1, so those elements of apparatus 100 are not described below to avoid unnecessarily duplicating the description herein. Logic circuit 704 is provided in place of logic circuit 110, which logic circuit 704 included correlation logic 104 and feature observation logic 106, as described in relation to logic circuit 110. Logic circuit 704 includes synchronization logic 702, which delays feature identification signal 120 output by feature observation logic 106 by a predetermined number of bits to generate a changed feature identification signal 706 (which may also be referred to herein as "third signal 706"). The predetermined number of bits represents the distance, in bits, between SSD and SFD. Generally speaking, changed feature identification signal 706 is suitable to indicate the portion of the data corresponding to the SFD.

Figure 8:
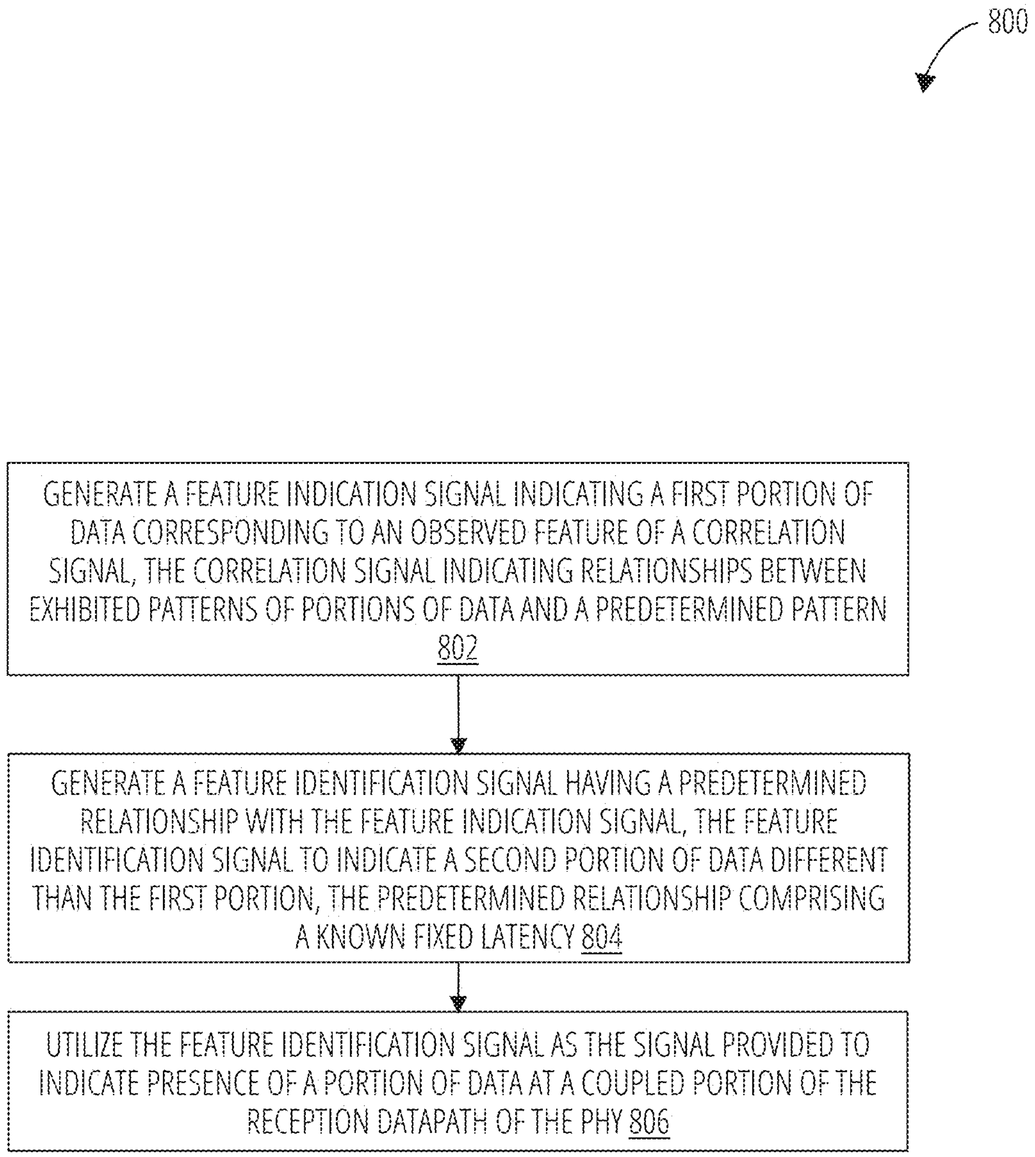
FIG. 8 is a flow diagram depicting a process to adjust timing of a signal to indicate presence of a portion of data corresponding to a predetermined pattern at a coupled portion of a reception datapath of a physical layer, in accordance with one or more examples.

FIG. 8 is a flow diagram depicting a process 800 to adjust timing of a signal for indicating presence of a portion of data corresponding to a predetermined pattern at a coupled portion of a reception datapath of a PHY, in accordance with one or more examples.

At operation 802, process 800 generates a feature identification signal (e.g., feature identification signal 120, without limitation) indicating a first portion of data (e.g., portion of data 116, without limitation) corresponding to an observed feature (e.g., a peak, without limitation) of a correlation signal (e.g., feature identification signal 120, without limitation) indicating relationships between exhibited patterns (e.g., exhibited patterns 128, without limitation) and a predetermined pattern (e.g., predetermined pattern 126, without limitation).

In one or more examples, the predetermined pattern 126 may correspond to an SSD or another known sequence of bits or symbols located a known fixed number of bits from an SFD of an Ethernet frame.

At operation 804, process 800 generates a further signal (e.g., changed feature identification signal 706, without limitation) having a predetermined timing relationship with the feature identification signal. In one or more examples, a value representing a known fixed latency (e.g., represented by a number of bits or bit-time, without limitation) may be added or subtracted to the feature identification signal to generate the further signal, and so the predetermined timing relationship may be represented by such a value. Such known fixed latency may correlate the feature identification signal (e.g., the feature identification signal 120, without limitation) to timing for another portion of data corresponding to a different pattern (e.g., different symbol(s), without limitation). As a non-limiting example, the second portion of data may include symbols of an SFD. Adding or subtracting the known fixed value effectively changes the timing indicated. In one or more examples, the further signal (e.g., changed feature identification signal 706, without limitation) may be generated by delaying the feature identification signal by a predetermined number of bits corresponding to the number of bits between an SFD and an SSD or other known sequence of bits or symbols located a fixed number of bits from an SFD of an Ethernet frame.

At operation 806, process 800 utilizes the further signal (e.g., changed feature identification signal 706) as the signal provided to indicate presence of a portion of data at a coupled portion of the reception datapath of the PHY. In one or more examples, the indication of presence may be inferred to be an indication of presence at a predetermined reference plane of a PHY such as an SFD crossing an MDI, without limitation.

A disclosed apparatus for indicating patterns exhibited by data on a reception datapath of a physical layer may not be needed for all types of messages. If the pre-determined patterns could be present in multiple message types, there may be false positives.

Figure 9:
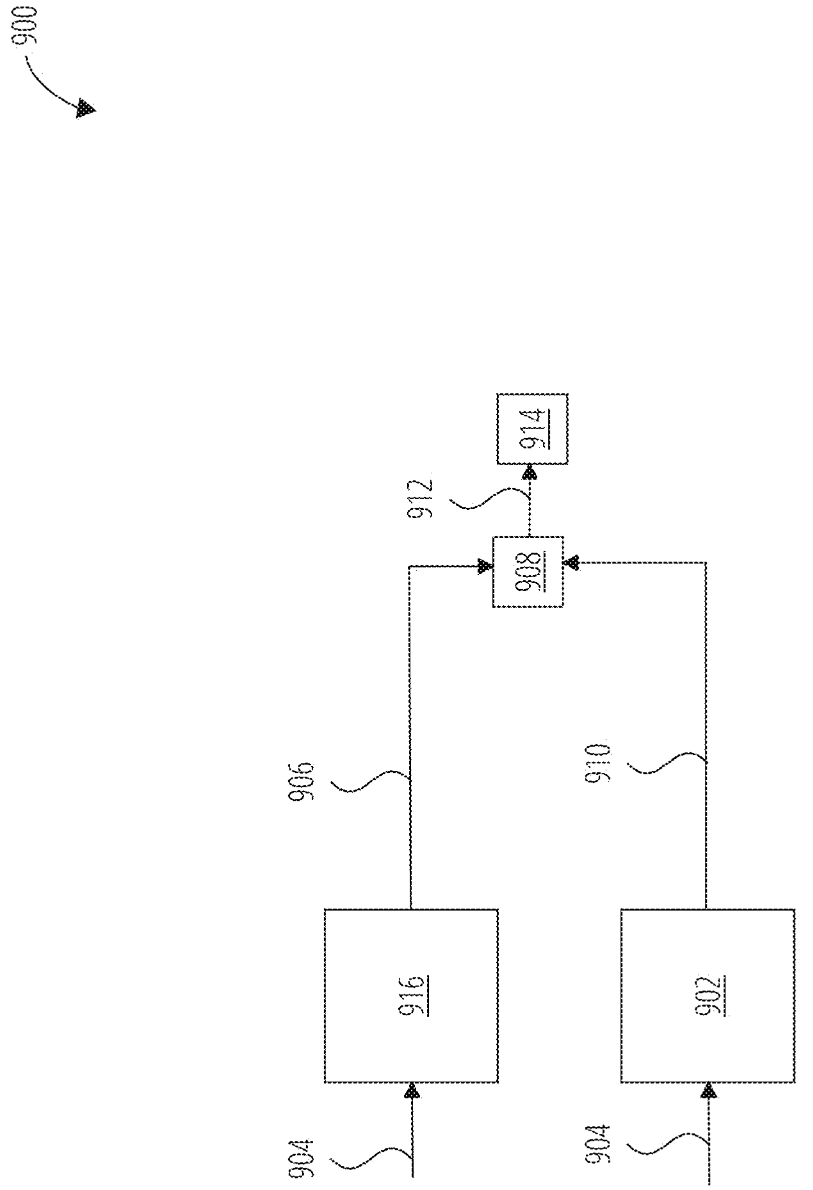
FIG. 9 is a block diagram depicting a system to indicate patterns exhibited by data of predetermined message types on a reception datapath of a physical layer, in accordance with one or more examples.

FIG. 9 is a block diagram depicting a system 900 to indicate patterns exhibited by data of predetermined message types on a reception datapath of a physical layer, in accordance with one or more examples. System 900 includes an apparatus 916, a packet pattern matcher 902, and a pulse generator 908. Apparatus 916 may be or include, as non-limiting examples, an apparatus 100 or apparatus 700. Apparatus 916 indicates patterns exhibited by data 904 match a predetermined pattern 126 (FIG. 1) by asserting a timing signal 906, which may be a second signal 120 of FIG. 1 or a third signal 706 of FIG. 7. Packet pattern matcher 902 indicates patterns exhibited by data 904 match predetermined patterns for specific packet types by asserting packet type signal 910. Pulse generator 908 generates a pulse 912 at least partially responsive to both timing signal 906 and packet type signal 910 being asserted.

Optionally the pulse may be communicated via a connector 914, which may be, or include, as a non-limiting example, an unassociated pin (i.e., unassociated with an MII, without limitation), such as a general purpose input/output pin of a microcontroller having a shorter clock period than an MII.

Figure 10:
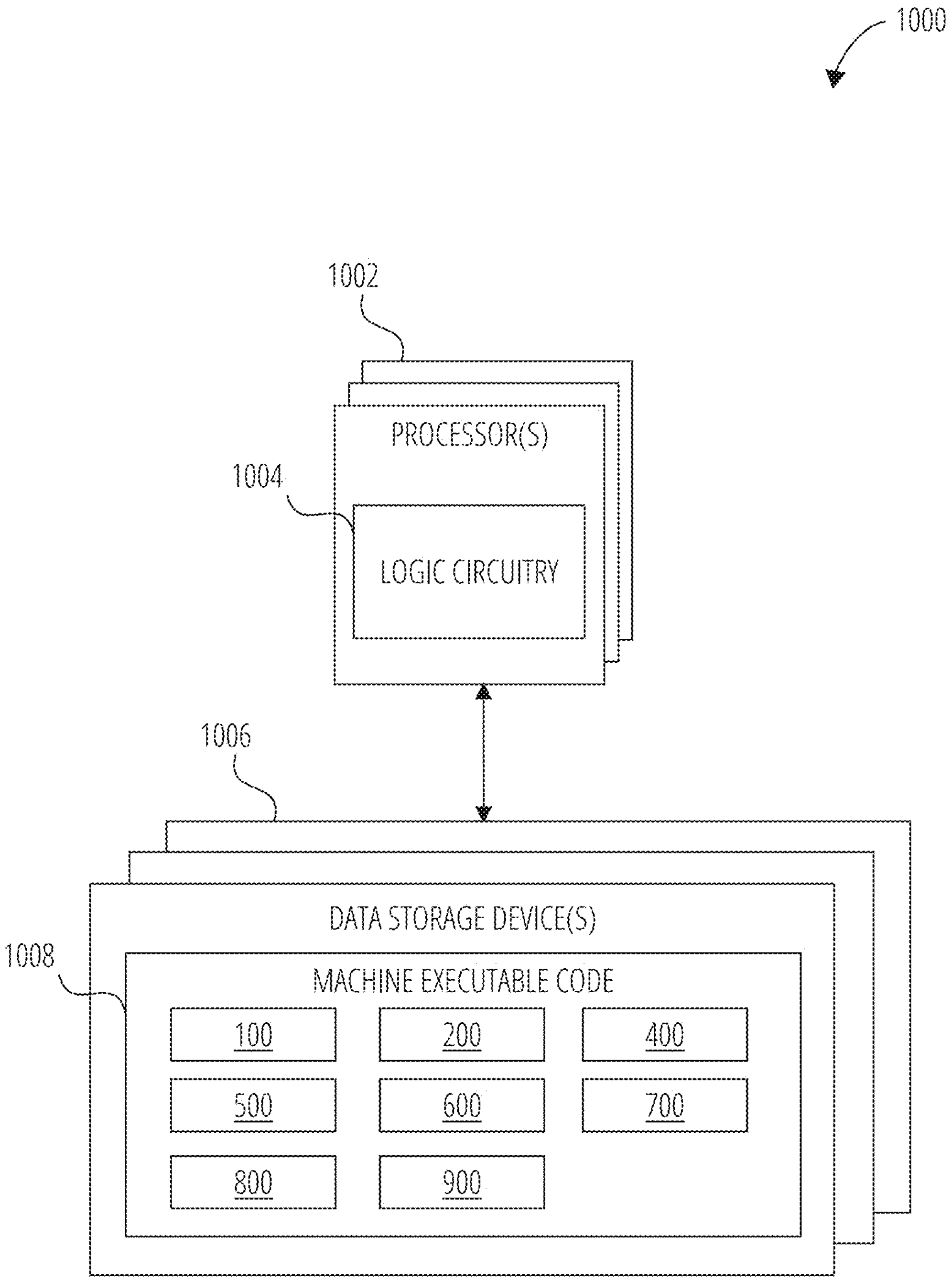
FIG. 10 is a block diagram of circuitry that, in one or more examples, may be used to implement various functions, operations, acts, processes, and/or methods disclosed, in accordance with one or more examples.

It will be appreciated by those of ordinary skill in the art that functional elements of examples disclosed herein (e.g., functions, operations, acts, processes, and/or methods) may be implemented in any suitable hardware, software, firmware, or combinations thereof. FIG. 10 illustrates non-limiting examples of implementations of functional elements disclosed herein. In some examples, some or all portions of the functional elements disclosed herein may be performed by hardware specially configured for carrying out the functional elements.

FIG. 10 is a block diagram of circuitry 1000 that, in some examples, may be used to implement various functions, operations, acts, processes, and/or methods disclosed herein. The circuitry 1000 includes one or more processors 1002 (sometimes referred to herein as "processors 1002") operably coupled to one or more data storage devices (sometimes referred to herein as "storage 1006"). The storage 1006 includes machine executable code 1008 stored thereon and the processors 1002 include logic circuitry 1004. The machine executable code 1008 includes information describing functional elements that may be implemented by (e.g., performed by) the logic circuitry 1004. The logic circuitry 1004 is adapted to implement (e.g., perform) the functional elements described by the machine executable code 1008. The circuitry 1000, when executing the functional elements described by the machine executable code 1008, should be considered as special purpose hardware for carrying out functional elements disclosed herein. In some examples the processors logic circuitry 1004 may perform the functional elements described by the machine executable code 1008 sequentially, concurrently (e.g., on one or more different hardware platforms), or in one or more parallel process streams.

When implemented by logic circuitry 1004 of the processors 1002, the machine executable code 1008 adapts the processors logic circuitry 1004 to perform operations of examples disclosed herein. By way of non-limiting example, the machine executable code 1008 may adapt the processors 1002 to perform some or a totality of operations of one or more of: apparatus 100, apparatus portion 200 as represented by graph 300, apparatus 700, and system 900. Also by way of non-limiting example, the machine executable code 1008 may adapt the processors 1002 to perform operations disclosed herein for process 400, process 500, process 600, or process 800.

The processors 1002 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute functional elements corresponding to the machine executable code 1008 (e.g., software code, firmware code, hardware descriptions) related to examples of the present disclosure. It is noted that a general-purpose processor (may also be referred to herein as a host processor or simply a host) may be a microprocessor, but in the alternative, the processors 1002 may include any conventional processor, controller, microcontroller, or state machine. The processors 1002 may also be implemented as a combination of computing devices, such as a combination of a DSP and a microprocessor, a plurality of microprocessors, one or more microprocessors in conjunction with a DSP core, or any other such configuration.

In some examples, the storage 1006 includes volatile data storage (e.g., random-access memory (RAM)), non-volatile data storage (e.g., Flash memory, a hard disc drive, a solid state drive, erasable programmable read-only memory (EPROM), etc.). In some examples the processors 1002 and the storage 1006 may be implemented into a single device (e.g., a semiconductor device product, a system on chip (SOC), etc.). In some examples the processors 1002 and the storage 1006 may be implemented into separate devices.

In some examples the machine executable code 1008 may include computer-readable instructions (e.g., software code, firmware code). By way of non-limiting example, the computer-readable instructions may be stored by the storage 1006, accessed directly by the processors 1002, and executed by the processors 1002 using at least the logic circuitry 1004. Also by way of non-limiting example, the computer-readable instructions may be stored on the storage 1006, transferred to a memory device (not shown) for execution, and executed by the processors 1002 using at least the logic circuitry 1004. Accordingly, in some examples the logic circuitry 1004 includes electrically configurable logic circuitry 1004.

In some examples the machine executable code 1008 may describe hardware (e.g., circuitry) to be implemented in the logic circuitry 1004 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, VERILOG™, SYSTEMVERILOG™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 1004 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some examples the machine executable code 1008 may include an HDL, an RTL, a GL description, a mask level description, other hardware description, or any combination thereof.

In examples where the machine executable code 1008 includes a hardware description (at any level of abstraction), a system (not shown, but including the storage 1006) may implement the hardware description described by the machine executable code 1008. By way of non-limiting example, the processors 1002 may include a programmable logic device (e.g., an FPGA or a PLC) and the logic circuitry 1004 may be electrically controlled to implement circuitry corresponding to the hardware description into the logic circuitry 1004. Also by way of non-limiting example, the logic circuitry 1004 may include hard-wired logic manufactured by a manufacturing system (not shown, but including the storage 1006) according to the hardware description of the machine executable code 1008.

Regardless of whether the machine executable code 1008 includes computer-readable instructions or a hardware description, the logic circuitry 1004 is adapted to perform the functional elements described by the machine executable code 1008 when implementing the functional elements of the machine executable code 1008. It is noted that although a hardware description may not directly describe functional elements, a hardware description indirectly describes functional elements that the hardware elements described by the hardware description are capable of performing.

As used in the present disclosure, the terms “module” or “component” may refer to specific hardware implementations configured to perform the actions of the module or component and/or software objects or software routines that may be stored on and/or executed by general purpose hardware (e.g., computer-readable media, processing devices, etc.) of the computing system. In some examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term “combination” with reference to a plurality of elements may include a combination of all the elements or any of various different subcombinations of some of the elements. For example, the phrase “A, B, C, D, or combinations thereof” may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as “open” terms (e.g., the term “including” should be interpreted as “including, but not limited to,” the term “having” should be interpreted as “having at least,” the term “includes” should be interpreted as “includes, but is not limited to,” etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases “at least one” and “one or more” to introduce claim recitations. However, the use of such phrases should not be construed to imply that the introduction of a claim recitation by the indefinite articles “a” or “an” limits any particular claim containing such introduced claim recitation to examples containing only one such recitation, even when the same claim includes the introductory phrases “one or more” or “at least one” and indefinite articles such as “a” or “an” (e.g., “a” and/or “an” should be interpreted to mean “at least one” or “one or more”); the same holds true for the use of definite articles used to introduce claim recitations. The term “each” should be interpreted to mean “some or a totality,” and the term “each and every” should be interpreted to mean “a totality.”

In addition, even if a specific number of an introduced claim recitation is explicitly recited, those skilled in the art will recognize that such recitation should be interpreted to mean at least the recited number (e.g., the bare recitation of “two recitations,” without other modifiers, means at least two recitations, or two or more recitations). Furthermore, in those instances where a convention analogous to “at least one of A, B, and C, etc.” or “one or more of A, B, and C, etc.” is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase “A or B” should be understood to include the possibilities of “A” or “B” or “A and B.”

While the present disclosure has been described herein with respect to certain illustrated examples, those of ordinary skill in the art will recognize and appreciate that the present disclosure is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention.

Example 1: A method, comprising: applying oversampling to data on a reception datapath of a physical layer device; generating a first signal indicating relationships between patterns exhibited by portions of oversampled data and a predetermined pattern; generating a second signal indicating an observed feature of the first signal, the observed feature indicative of a highest relationship between the patterns exhibited by respective portions of oversampled data and the predetermined pattern; and providing the second signal to indicate presence of a portion of data corresponding to the predetermined pattern at a coupled portion of the reception datapath of the physical layer.

Example 2: The method according to Example 1, wherein the coupled portion of the reception datapath of the physical layer device corresponds to a predetermined reference plane of the physical layer device.

Example 3: The method according to Examples 1 and 2, wherein the predetermined reference plane corresponds to a media dependent interface.

Example 4: The method according to Examples 1 through 3, comprising: observing a difference or similarity between a pattern exhibited by a portion of oversampled data and the predetermined pattern; determining a relationship between the pattern exhibited by the portion of oversampled data and the predetermined pattern at least partially responsive to the observed difference or similarity; and setting a value of the first signal to correspond to the determined relationship between the pattern exhibited by the portion of oversampled data and the predetermined pattern.

Example 5: The method according to Examples 1 through 4, comprising: observing one or more peaks of the first signal; and choosing a highest of the observed one or more peaks of the first signal for the feature indicative of the highest relationship between the patterns exhibited by respective portions of oversampled data and the predetermined pattern.

Example 6: The method according to Examples 1 through 5, comprising: generating a feature identification signal indicating a first portion of oversampled data corresponding to the observed feature; generating a changed feature identification signal having a predetermined relationship with the feature identification signal, the changed feature identification signal to indicate a second portion of data having a predetermined relationship with the first portion, the second portion of data different than the first portion of data; and utilizing the changed feature identification signal as the second signal.

Example 7: The method according to Examples 1 through 6, wherein the predetermined relationship is a known-fixed latency.

Example 8: An apparatus, comprising: a data sampling circuit to oversample data at a reception datapath of a physical layer device; and a logic circuit, comprising: a correlation logic to generate a first signal, the first signal indicative of relationships between patterns exhibited by portions of oversampled data and a predetermined pattern; a feature observation logic to generate a second signal, the second signal indicative of an observed feature of the first signal, the feature indicative of a highest relationship between patterns exhibited by respective portions of oversampled data and the predetermined pattern; and a synchronization logic to generate a third signal, the third signal indicative of a portion of the data corresponding to the observed feature.

Example 9: The apparatus according to Example 8, wherein the data sampling circuit is coupled to a portion of a data reception path that corresponds to a predetermined reference plane of a physical layer device.

Example 10: The apparatus according to Examples 8 and 9, wherein the predetermined reference plane corresponds to a media dependent interface.

Example 11: The apparatus according to Examples 8 through 10, the correlation logic comprises logic to: observe a difference or similarity between a pattern exhibited by a portion of oversampled data and the predetermined pattern; determine a relationship between the pattern exhibited by the portion of oversampled data and the predetermined pattern at least partially responsive to the observed difference or similarity; and set a value of the first signal to correspond to the determined relationship between the pattern exhibited by the portion of oversampled data and the predetermined pattern.

Example 12: The apparatus according to Examples 8 through 11, wherein the observed feature of the first signal comprises a peak.

Example 13: The apparatus according to Examples 8 through 12, wherein the data sampling circuit to oversample the data at a portion of the data reception path before a physical coding sublayer of the physical layer.

Example 14: The apparatus according to Examples 8 through 13, wherein the synchronization logic to: generate the third signal having a predetermined relationship with the second signal, the third signal to indicate a second portion of data different than a first portion.

Example 15: The apparatus according to Examples 8 through 14, wherein the predetermined relationship is a known fixed latency.

What is claimed is:

1. A method, comprising:
applying oversampling to data on a reception datapath of a physical layer device;
generating a first signal indicating relationships between patterns exhibited by portions of oversampled data and a predetermined pattern;
generating a second signal indicating an observed feature of the first signal, the observed feature indicative of a highest relationship between the patterns exhibited by respective portions of oversampled data and the predetermined pattern; and
providing the second signal to indicate presence of a portion of data corresponding to the predetermined pattern at a coupled portion of the reception datapath of the physical layer.

2. The method of claim 1, wherein the coupled portion of the reception datapath of the physical layer device corresponds to a predetermined reference plane of the physical layer device.

3. The method of claim 2, wherein the predetermined reference plane corresponds to a media dependent interface.

4. The method of claim 1, comprising:
observing a difference or similarity between a pattern exhibited by a portion of oversampled data and the predetermined pattern;
determining a relationship between the pattern exhibited by the portion of oversampled data and the predetermined pattern at least partially responsive to the observed difference or similarity; and
setting a value of the first signal to correspond to the determined relationship between the pattern exhibited by the portion of oversampled data and the predetermined pattern.

5. The method of claim 1, comprising:
observing one or more peaks of the first signal; and
choosing a highest of the observed one or more peaks of the first signal for the feature indicative of the highest relationship between the patterns exhibited by respective portions of oversampled data and the predetermined pattern.

6. The method of claim 1, comprising:
generating a feature identification signal indicating a first portion of oversampled data corresponding to the observed feature;
generating a changed feature identification signal having a predetermined relationship with the feature identification signal, the changed feature identification signal to indicate a second portion of data having a predetermined relationship with the first portion, the second portion of data different than the first portion of data; and
utilizing the changed feature identification signal as the second signal.

7. The method of claim 6, wherein the predetermined relationship is a known-fixed latency.

8. An apparatus, comprising:
a data sampling circuit to oversample data at a reception datapath of a physical layer device; and
a logic circuit, comprising:
a correlation logic to generate a first signal, the first signal indicative of relationships between patterns exhibited by portions of oversampled data and a predetermined pattern;
a feature observation logic to generate a second signal, the second signal indicative of an observed feature of the first signal, the feature indicative of a highest relationship between patterns exhibited by respective portions of oversampled data and the predetermined pattern; and
a synchronization logic to generate a third signal, the third signal indicative of a portion of the data corresponding to the observed feature.

9. The apparatus of claim 8, wherein the data sampling circuit is coupled to a portion of a data reception path that corresponds to a predetermined reference plane of a physical layer device.

10. The apparatus of claim 9, wherein the predetermined reference plane corresponds to a media dependent interface.

11. The apparatus of claim 8, the correlation logic comprises logic to:
observe a difference or similarity between a pattern exhibited by a portion of oversampled data and the predetermined pattern;
determine a relationship between the pattern exhibited by the portion of oversampled data and the predetermined pattern at least partially responsive to the observed difference or similarity; and
set a value of the first signal to correspond to the determined relationship between the pattern exhibited by the portion of oversampled data and the predetermined pattern.

12. The apparatus of claim 8, wherein the observed feature of the first signal comprises a peak.

13. The apparatus of claim 8, wherein the data sampling circuit to oversample the data at a portion of the data reception path before a physical coding sublayer of the physical layer.

14. The apparatus of claim 8, wherein the synchronization logic to:
generate the third signal having a predetermined relationship with the second signal, the third signal to indicate a second portion of data different than a first portion.

15. The apparatus of claim 14, wherein the predetermined relationship is a known fixed latency.

16. The method of claim 1, wherein the reception datapath of the physical layer device is a baseband Ethernet reception datapath.

17. The method of claim 16, wherein the physical layer device is operable according to a multidrop Ethernet standard.

18. The method of claim 1, comprising generating a timestamp at least partially responsive to the second signal, the timestamp indicative of when the portion of data corresponding to the predetermined pattern crosses a predetermined reference plane of the physical layer device.

19. The method of claim 1, comprising generating the second signal responsive to observing that a level of the first signal exceeds a peak threshold value, the observed feature being a peak amplitude of the first signal above the peak threshold value.

20. The apparatus of claim 8, wherein the reception datapath of the physical layer device is a baseband Ethernet reception datapath.

21. The apparatus of claim 20, wherein the physical layer device operable according to a multidrop Ethernet standard.

22. The apparatus of claim 8, comprising:

a packet pattern matcher to generate a packet type signal indicative of patterns exhibited by data matching predetermined patterns for specific packet types; and a pulse generator to generate a pulse at least partially responsive to both a timing signal from the logic circuit and the packet type signal from the packet pattern matcher.

23. The apparatus of claim 22, comprising a connector to communicate the pulse, the connector comprising a pin unassociated with a media independent interface and having a shorter clock period than the media independent interface.

24. The apparatus of claim 8, wherein the feature observation logic to generate the second signal at least partially responsive to observing that a level of the first signal exceeds a peak threshold value, the observed feature being a peak amplitude of the first signal above the peak threshold value.

* * * * *